(12) United States Patent
Colmenarejo Matellano et al.

(10) Patent No.: US 12,728,977 B2
(45) Date of Patent: Sep. 8, 2026

(54) ASSEMBLY COMPRISING A CONTINUOUS STRUCTURAL ELEMENT FOR AIRCRAFT AND A FITTING

(71) Applicant: Airbus Operations S.L.U., Getafe (ES)

(72) Inventors: Nuria Colmenarejo Matellano, Getafe (ES); Esther Sola Casado, Getafe (ES); David Martín Calvo, Getafe (ES); Raúl Gómez Vizcaíno, Getafe (ES); Jorge Ballestero Mendez, Getafe (ES); Ana Fernández Ramírez, Getafe (ES)

(73) Assignee: Airbus Operations S.L.U., Getafe (ES)

( * ) Notice: Subject to any disclaimer, the term of this patent is extended or adjusted under 35 U.S.C. 154(b) by 0 days.

(21) Appl. No.: 19/201,286

(22) Filed: May 7, 2025

(65) Prior Publication Data

US 2025/0346341 A1 Nov. 13, 2025

(30) Foreign Application Priority Data

May 8, 2024 (EP) .................................... 24174930

(51) Int. Cl.
*B64C 1/06* (2006.01)
*F16B 5/04* (2006.01)

(52) U.S. Cl.
CPC ................ *B64C 1/061* (2013.01); *F16B 5/04* (2013.01)

(58) Field of Classification Search
CPC ......... B64C 1/065; B64C 1/061; B64C 1/064; B64C 1/06; B64C 3/18; B64C 3/182; B64C 3/185; B64C 3/187
See application file for complete search history.

(56) References Cited

U.S. PATENT DOCUMENTS 1,847,559 A * 3/1932 Hall ........................ B64C 1/064 114/271
4,907,733 A * 3/1990 Pratt .................... C04B 37/026 228/124.1
2011/0001010 A1 1/2011 Tacke et al.
2013/0082143 A1 4/2013 Storozuk
2014/0027573 A1 1/2014 Cazeneuve et al.

FOREIGN PATENT DOCUMENTS

CN 101883717 A 11/2010
EP 2692631 B1 5/2015
EP 2760734 B1 2/2017
GB 492796 A 9/1938

OTHER PUBLICATIONS

European Search Report for corresponding European Patent Application No. 24174930.8 dated Oct. 10, 2024.

* cited by examiner

*Primary Examiner* — Nicholas McFall
*Assistant Examiner* — Eric Acosta
(74) *Attorney, Agent, or Firm* — Greer, Burns & Crain, Ltd.

(57) ABSTRACT

An assembly with a continuous structural element for aircraft and a fitting. The continuous structural element has an outer flange, an inner flange and a web between the flanges. The inner flange has at least one portion with a wavy shape such that the height of the web increases or decreases in that portion. The fitting has at least one through hole and is configured to fit the web at the portion of the inner flange with a wavy shape so that in an assembled state the fitting is joined to the web in such a way that the at least one through hole of the fitting is not covered by the web.

9 Claims, 6 Drawing Sheets

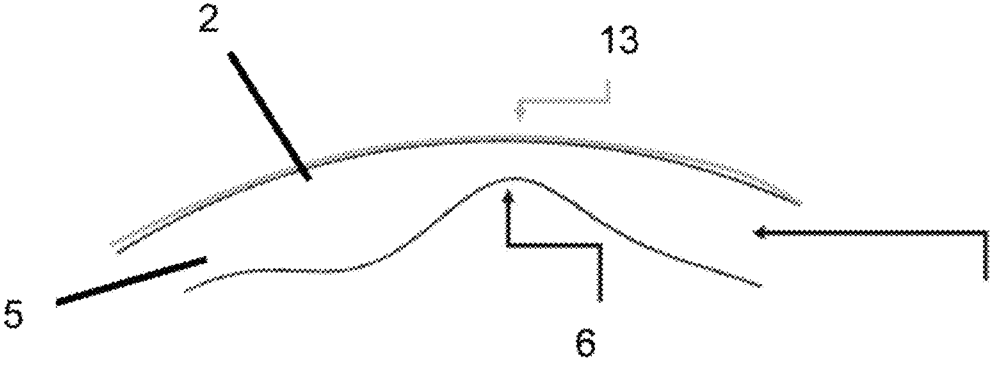
FIG. 4
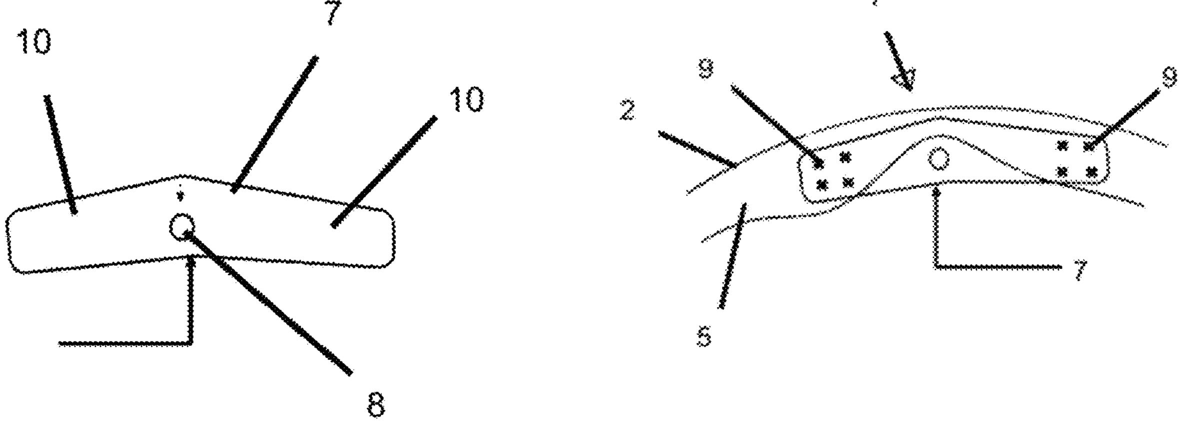
FIG. 5
FIG. 6

ASSEMBLY COMPRISING A CONTINUOUS STRUCTURAL ELEMENT FOR AIRCRAFT AND A FITTING

CROSS-REFERENCES TO RELATED APPLICATIONS

This application claims the benefit of European Patent Application Number 24174930.8 filed on May 8, 2024, the entire disclosure of which is incorporated herein by way of reference.

FIELD OF THE INVENTION

The present invention relates to an assembly comprising a continuous structural element for aircraft (such as a frame, a beam, etc.) and a fitting. It is particularly applicable to zones with high input punctual load levels and with space problems for assembling large elements to continuous structural elements in aircraft.

BACKGROUND OF THE INVENTION

In continuous structural elements for aircraft (such as frames, beams, etc.) the inner flange is a copy of the shape of the outer flange (which copies the shape of the skin to which it is attached, with slight changes in the web height of the continuous structural element).

For these elements, in case of joining elements through fittings with lugs, these lugs need to be outside the inner flange in order to be able to have access during the assembly process.

These prior art configurations provide options to join different elements to continuous structural elements such as frames or beams. However, there is a need to provide an assembly that takes up little space and therefore maximizes the usable space for the elements to be joined.

SUMMARY OF THE INVENTION

Thus, it is an object of the invention to provide an assembly comprising a continuous structural element for aircraft and a fitting that is able to overcome the mentioned drawbacks.

The invention provides an assembly comprising a continuous structural element for aircraft and a fitting, wherein:

- the continuous structural element for aircraft comprises an outer flange, an inner flange and a web between the outer flange and the inner flange, the inner flange have having at least one portion with a wavy shape such that the height of the web increases or decreases in the at least one portion of the web corresponding to the at least one portion of the inner flange with a wavy shape, and
- the fitting comprises at least one through hole and is configured to fit one portion of the web corresponding to one portion of the inner flange with a wavy shape, such that in an assembled state the fitting is joined to the portion of the web corresponding to one portion of the inner flange with a wavy shape by connecting means, in such a way that the at least one through hole of the fitting is not covered by the web.

The assembly of the invention has the following advantages:

- Maximizes the usable space for the elements to be connected, mainly for large elements.
- Splits the load into a larger area.
- It is easy to inspect, maintain and repair.
- Continuous support of the skin in the direction of wavy structural element.

Other features and advantages of the present invention will become apparent from the following detailed description of an illustrative embodiment and not limiting its purpose in connection with the accompanying figures.

BRIEF DESCRIPTION OF THE DRAWINGS

FIG. 4 shows an area with a wavy contour of the continuous structural element for aircraft.

FIG. 5 shows a fitting of the invention.

FIG. 6 shows an assembly comprising a continuous structural element for aircraft and the fitting of FIG. 5.

DETAILED DESCRIPTION OF THE PREFERRED EMBODIMENTS

Figure 3:
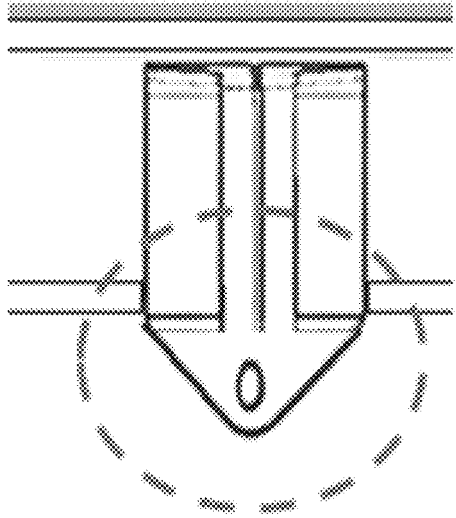
FIG. 3 shows the joining of elements through fittings with lugs in the prior art.

FIG. 3 shows the joining of two elements through a fitting with a lug in the prior art, in which the lug needs to be outside the inner flange in order to be able to have access during the assembly process.

Figure 1:
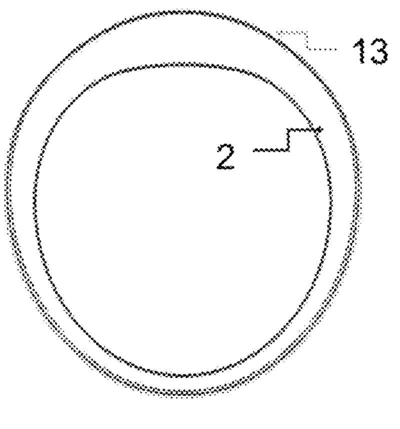
FIG. 1 shows a section of a prior art frame as a continuous structural element for aircraft, and a skin.
Figure 2:
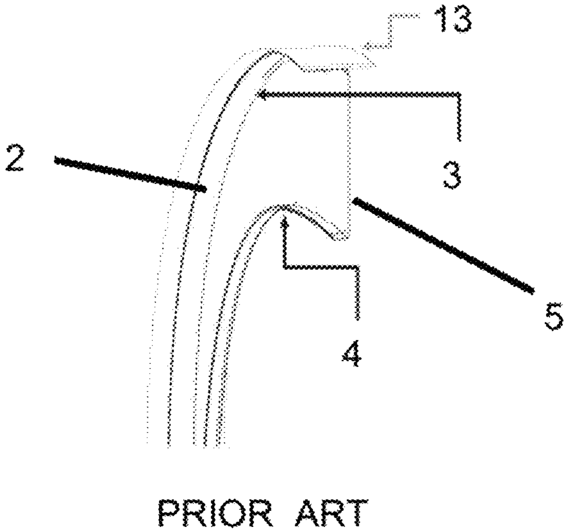
FIG. 2 shows a section of a prior art frame, showing its elements, and a skin.

FIG. 2 is a section of a frame, showing the skin 13, the outer flange 3, the inner flange 4 and the web 5 between the outer flange 3 and the inner flange 4.

The assembly 1 comprising a continuous structural element 2 for aircraft and a fitting 7 of the invention is shown in FIG. 6. In this assembly 1 the continuous structural element 2 for aircraft (see FIG. 4) comprises an outer flange 3, an inner flange 4 and a web 5 between the outer flange 3 and the inner flange 4. The inner flange 4 has at least one portion with a wavy shape 6 such that the height of the web 5 increases or decreases in the portions of the web 5 corresponding to the at least one portion of the inner flange 4 with a wavy shape 6.

The assembly 1 also comprises a fitting 7 (shown in FIG. 5), which comprises at least one through hole 8 and is configured to fit one portion of the web 5 corresponding to one portion of the inner flange 4 with a wavy shape 6, being able to fit into the gap left by the wavy contour in the portion of the web 5 with a lower height.

In an assembled state the fitting 7 is joined to the portion of the web 5 corresponding to one portion of the inner flange

4 with a wavy shape 6 by connecting means, in such a way that the at least one through hole 8 of the fitting 7 is not covered by the web 5.

The fitting 7 can be joined to the portion of the web 5 corresponding to one portion of the inner flange 4 with a wavy shape 6 by several rivets 9.

The fitting 7 can comprise two sections 10.

As for the continuous structural element 2 for aircraft, it can be a frame or a beam.

A method to install an element 11 with lugs 12 on the assembly 1 comprising a continuous structural element 2 for aircraft and a fitting 7 of the invention, the lugs 12 comprising a through hole 14, comprises the following steps:

bringing the fitting 7 into contact with the web 5 of the continuous structural element 2 for aircraft, joining the fitting 7 to the continuous structural element 2 for aircraft, and joining the element 11 with lugs 12 to the fitting 7.

Figure 9:
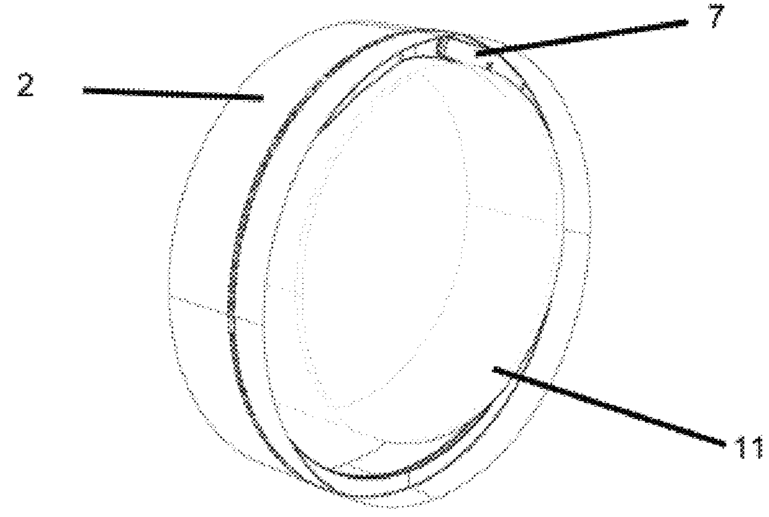
FIG. 9 shows a final step of the installation method from FIG. 7.

This last joining can be performed with a lug bolt or by riveting. For the lug bolt option, the lug bolt crosses the through hole 14 of the lug 12 of the element 11 with lugs 12 and the through hole 8 of the fitting 7 (FIG. 9). For the riveting option, the element 11 with lugs 12 is joined to the fitting 7 by means of rivets 9 or other connecting means.

Figure 7:
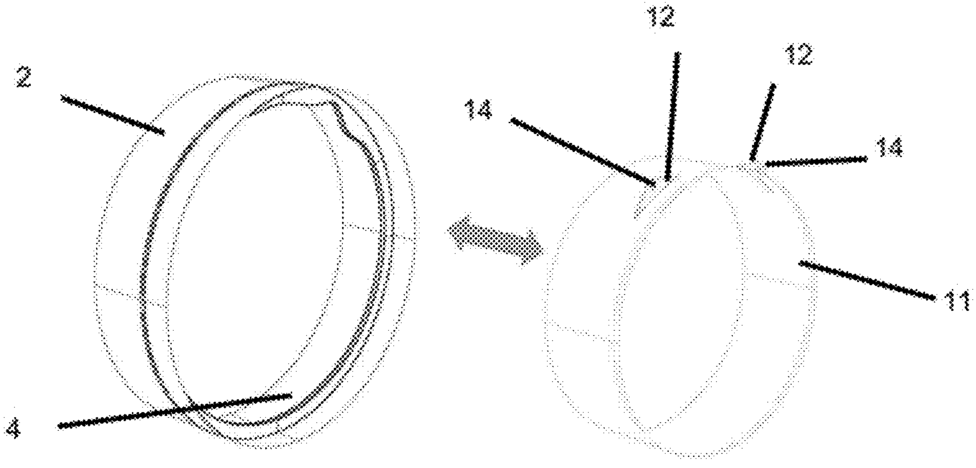
FIG. 7 shows a first step of an installation method of the present invention with an element with lugs on an assembly comprising a continuous structural element for aircraft and a fitting.
Figure 8:
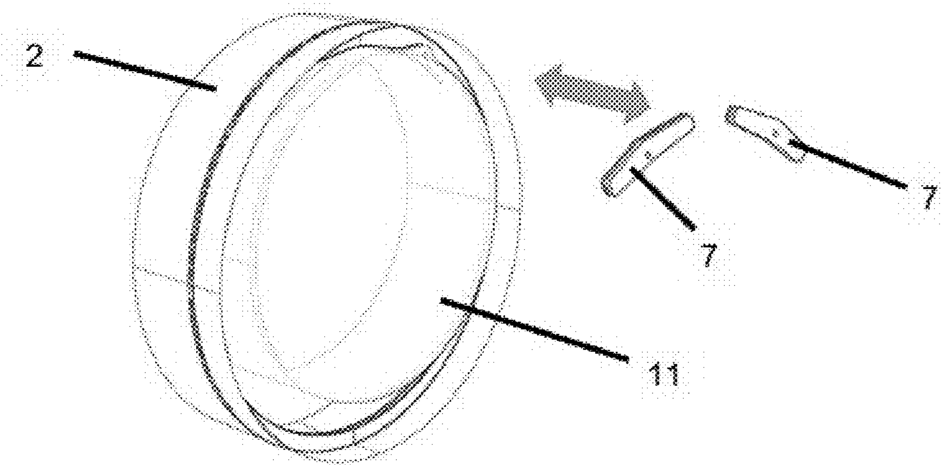
FIG. 8 shows a second step of the installation method from FIG. 7.
Figure 10:
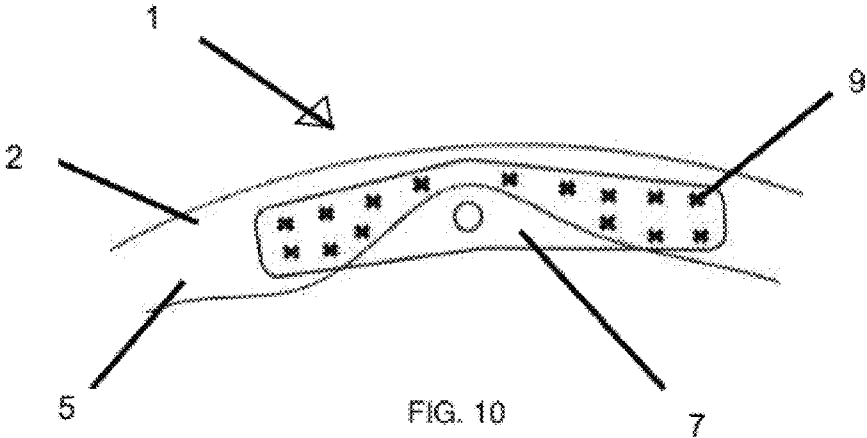
FIG. 10 shows an assembly comprising a continuous structural element for aircraft and a fitting of the invention, with a different riveting pattern.

According to another method to install an element 11 with lugs 12, in a first step the element 11 with lugs 12 is introduced into the continuous structural element 2 for aircraft with the lugs 12 under the space allowance given by the wavy shape 6 (FIG. 7). Afterwards the fitting 7 is brought into contact with the web 5 of the continuous structural element 2 for aircraft (FIG. 8), and finally the fitting 7 is joined to the continuous structural element 2 for aircraft and to the element 11 with lugs 12. The fittings 7 can be fastened to the continuous structural element 2 for aircraft in different ways, for instance, by riveting (as seen in FIGS. 6 and 10). FIG. 10 shows a riveting pattern that comprises rivets 9 near the part of the web 5 with less height.

Although the present invention has been fully described in connection with preferred embodiments, it is apparent that modifications can be made within the scope, not considering this as limited by these embodiments, but by the content of the following claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly comprising:

a continuous structural element for an aircraft; and, a fitting, wherein the continuous structural element for the aircraft comprises:

an outer flange, an inner flange, and a web between the outer flange and the inner flange, wherein the inner flange has at least one portion with a wavy shape such that a smallest thickness of the web occurs at a center of the wavy shape, and a thickness of the web on either side of the center of the wavy shape increases continuously along the inner flange until reaching apexes of the wavy shape on either side of the center of the wavy shape, such that a largest thickness of the wavy shape occurs at the apexes of the wavy shape, and wherein the fitting comprises at least one through hole and is configured to fit a portion of the web at the at least one portion of the inner flange with the wavy shape such that in an assembled state the fitting is joined to the portion of the web by connecting means so that the at least one through hole of the fitting is not covered by the web.

2. The assembly according to claim 1, wherein the connecting means comprises a plurality of rivets which form a riveting pattern.

3. The assembly according to claim 2, wherein the riveting pattern comprises rivets proximate a part of the web having a reduced height.

4. The assembly according to claim 1, wherein the fitting comprises two sections.

5. The assembly according to claim 1, wherein the continuous structural element for the aircraft is a frame of the aircraft.

6. The assembly according to claim 1, wherein the continuous structural element for the aircraft is a beam of the aircraft.

7. The assembly according to claim 1, wherein, along the wavy shape of the inner flange beyond the apexes in a direction away from the center of the wavy shape along the inner flange, the thickness of the web decreases.

8. The assembly according to claim 1, wherein the at least one through hole is aligned with the center of the wavy shape.

9. The assembly according to claim 4, further comprising:

an component installed on the continuous structural element for the aircraft, the component comprising two lugs with through holes which align with the one of the at least one through hole of each of the two sections of the fitting.

* * * * *